Mar. 20, 1923.

G. A. GILLEN 1,448,737

TRANSMISSION LOCK FOR AUTOMOBILES

Filed June 27, 1922

George A. Gillen, Inventor

By his Attorney

Maxwell Barns

Patented Mar. 20, 1923.

1,448,737

UNITED STATES PATENT OFFICE.

GEORGE A. GILLEN, OF JERSEY CITY, NEW JERSEY.

TRANSMISSION LOCK FOR AUTOMOBILES.

Application filed June 27, 1922. Serial No. 571,172.

*To all whom it may concern:*

Be it known that I, GEORGE A. GILLEN, a citizen of the United States, and a resident of Jersey City, in the county of Hudson and State of New Jersey, have invented certain new and useful Improvements in Transmission Locks for Automobiles, of which the following is a specification, reference being had to the accompanying drawings, which form a part hereof.

My invention relates to transmission locks for use on motor vehicles to prevent theft.

The object of my invention is to provide a locking device adapted to be applied to that type of transmission of a motor vehicle known as the planetary type. My device is particularly useful in that it may be readily applied to cars now in use, such as Ford cars, with no change in the ordinary parts of the transmission. I prefer to use the device to lock the reverse drum of the transmission. With such arrangement the rear wheels can be rotated backwards only and even then slowly and with great difficulty since owing to the reverse gearing the engine must also be rotated relatively rapidly against compression. It is thus difficult for a person, unless he first unlock the mechanism, to move the car without being detected or at any but a very slow speed. At the same time this arrangement allows of slow movement of the vehicle in case of emergency.

One form of my invention is illustrated in the accompanying drawings in which

Figure 1:
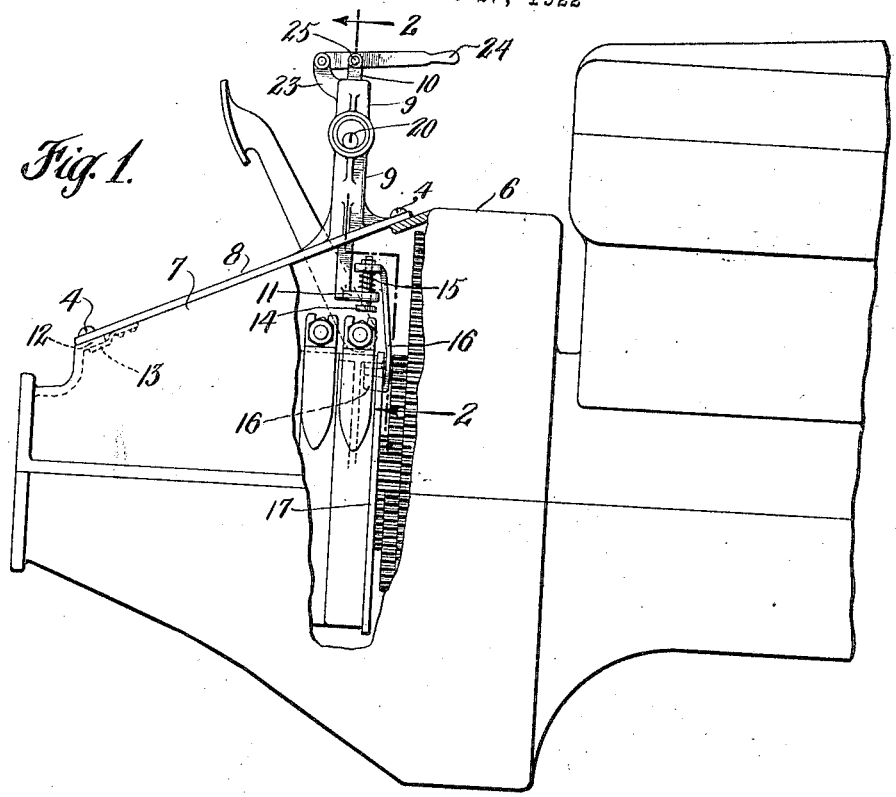
Fig. 1 is a fragmentary side view of a motor and transmission showing my improved locking device applied thereto.
Figure 2:
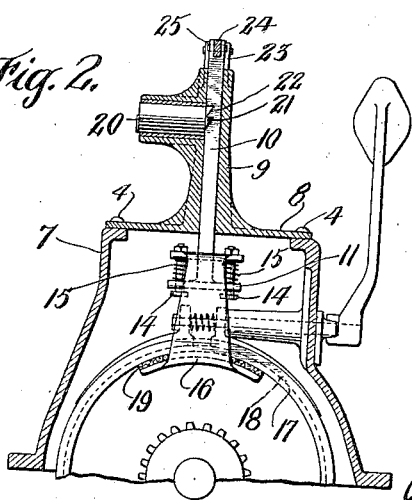
Fig. 2 is a rear view in section along the lines 2—2 of Fig. 1.
Figure 3:
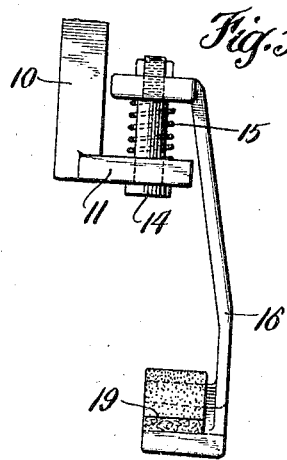
Fig. 3 is a detailed view of the drum locking brake shoe.

Referring to the drawings, 6 is the transmission housing provided with the usual opening 7 in its upper side. This opening is closed by a plate 8 which may be attached to it by screws 4, the shape of the plate and position of the screws being such that it may be readily substituted for the usual transmission housing cover plate. The plate 8 carries the sleeve 9 through which extends the plunger 10. Riveted beneath the rear end of the plate 8 is the flange 13 which extends underneath the lips 12 at the rear end of the housing as shown in Fig. 1. At the base of the plunger 10 is the forwardly extending flange 11 to which is resiliently attached by means of bolts 14 and springs 15, the locking brake shoe 16, which is shaped as illustrated to pass forwardly around and beneath the interior circumference 17 of the drum 18. The contact surface of the shoe 16 is provided with a suitable brake lining 19.

The sleeve 9 is fitted with a lock 20 which serves to lock the plunger 10 in raised or lowered position as desired; the locking bolt 21 co-operating for this purpose with a plurality of notches 22 in the plunger 10.

At the top of the sleeve 9 is the fulcrum flange 23 to which is pivoted the lever 24. The lever 24 in turn is pivoted at 25 to the top of the plunger 10.

The operation of the device is as follows: By raising the lever 24 the plunger 10 is forcibly drawn upwards thereby raising the locking shoe 16 and causing its lining 19 to contact with the inner circumference 17 of the drum 18. This frictional contact effectively interferes with the rotation of the drum. I have found that no great pressure between the shoe and the reverse drum is required in order to practically prevent the motion of the car when the device is locked in this position. To unlock the device the key is applied to the lock 20 to release the locking bolt 21 from its notch and the lever 24 is lowered forcing down the plunger 10 and pushing the lug 19 of the locking shoe 16 out of contact with the inner circumference 17 of the drum 18. In this position the reverse drum is free to function normally.

It will be noted that when the device is in locked position the cover plate 8 cannot be removed even if the screws 4 are withdrawn since it is held in place by the flange 13 beneath the lips 12 and by the locking shoe 16, beneath the inner circumference 17 of the drum 18.

From the foregoing it will be obvious that many changes may be made in the form and details of the device without departing from the spirit and scope of my invention.

What I claim is:

1. In a lock for automobiles having a planetary transmission system, a plunger extending through the transmission housing adapted to be raised or lowered, means for locking the plunger, and a locking shoe associated with said plunger and braking the inner circumference of the reverse transmission drum or leaving it free to revolve according to the position of said plunger 2. In a lock for automobiles having a planetary transmission system, a cover plate for the transmission housing, a plunger extending through said cover plate and adapted to be raised or lowered, means for locking said plunger, a locking shoe associated with said plunger braking the inner circumference of the reverse transmission drum or leaving it free to revolve according to the position of said plunger, and means for preventing the removal of said cover plate when said locking shoe is in braking position.

3. In a lock for automobiles having a planetary transmission system, a plunger extending through the transmission housing adapted to be raised or lowered, means for locking the plunger, and a locking shoe associated with said plunger and braking the inner circumference of a gear transmission drum or leaving it free to revolve according to the position of said plunger.

4. In a lock for automobiles having a planetary transmission system, a cover plate for the transmission housing, a plunger extending through said cover plate and adapted to be raised or lowered, means for locking said plunger, a locking shoe associated with said plunger braking the inner circumference of a gear transmission drum or leaving it free to revolve according to the position of said plunger, and means for preventing the removal of said cover plate when said locking means is in braking position.

5. In a lock for automobiles having a planetary transmission system, a plunger extending through the transmission housing adapted to be raised or lowered, means for locking the plunger, and a locking shoe resiliently connected with said plunger and braking the inner circumference of the reverse transmission drum or leaving it free to revolve according to the position of said plunger.

6. In a lock for automobiles having a planetary transmission system, a cover plate for the transmission housing, a plunger extending through said cover plate and adapted to be raised or lowered, means for locking said plunger, a locking shoe resiliently connected with said plunger braking the inner circumference of the reverse transmission drum or leaving it free to revolve according to the position of said plunger, and means for preventing the removal of said cover plate when said locking shoe is in braking position.

GEORGE A. GILLEN.